United States Patent [19]

Wittrisch

[11] Patent Number: 4,990,853
[45] Date of Patent: Feb. 5, 1991

[54] PROTECTIVE DEVICE PERMITTING MORE SPECIALLY THE USE OF PROBE IN LARGE DIAMETER WELLS

[75] Inventor: Christian Wittrisch, Rueil-Malmaison, France

[73] Assignee: Institut Francais du Petrole, Rueil Malmaison, France

[21] Appl. No.: 424,926

[22] Filed: Oct. 23, 1989

Related U.S. Application Data

[63] Continuation of Ser. No. 69,174, Jul. 2, 1987, Pat. No. 4,929,915.

[30] Foreign Application Priority Data

Feb. 27, 1987 [FR] France ................... 87 02757

[51] Int. Cl.⁵ .......................... G01V 3/20; G01V 3/28
[52] U.S. Cl. ................... 324/347; 324/339; 324/366
[58] Field of Search ................... 324/338–343, 324/347, 366, 368, 369; 73/152; 250/256, 265, 266, 268; 166/250

[56] References Cited

U.S. PATENT DOCUMENTS

| Re. 23,621 | 2/1953 | Hildebrandt | 324/347 |
| 2,264,318 | 12/1941 | Lee | 324/339 |
| 2,930,969 | 3/1960 | Baker | 324/347 |
| 2,964,698 | 12/1960 | Lehmberg, Jr. | 324/339 |
| 3,057,409 | 10/1962 | Grossman, Jr. | 324/368 X |
| 3,293,542 | 12/1966 | Piety | 324/369 |
| 3,388,325 | 6/1968 | Birdwell et al. | 324/339 X |
| 3,466,533 | 9/1969 | Doll et al. | 324/339 |
| 4,264,862 | 4/1981 | Koelle et al. | 324/339 |
| 4,286,217 | 8/1981 | Planche et al. | 324/347 |
| 4,323,848 | 4/1982 | Kuckes | 324/338 |

FOREIGN PATENT DOCUMENTS

81/03382 11/1981 World Int. Prop. O. ......... 324/366

Primary Examiner—Gerald R. Strecker
Attorney, Agent, or Firm—Antonelli, Terry, Stout & Kraus

[57] ABSTRACT

The present invention relates to a device and method for using a logging probe of small diameter with resect to a well in which it is to operate. The device of the invention is characterized in that it includes a widener for widening the diameter of said probe.

12 Claims, 6 Drawing Sheets

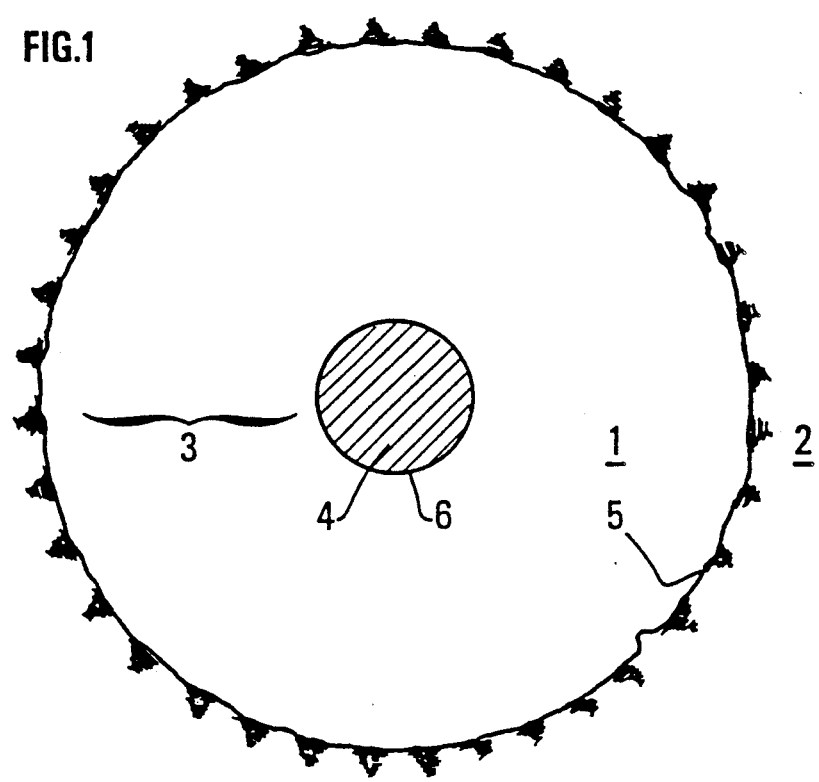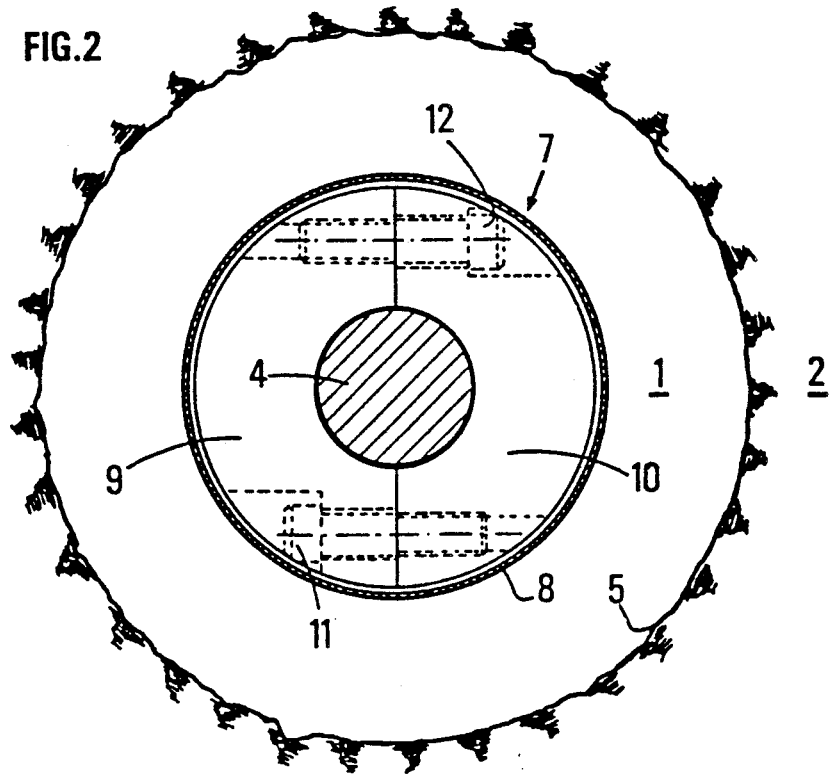

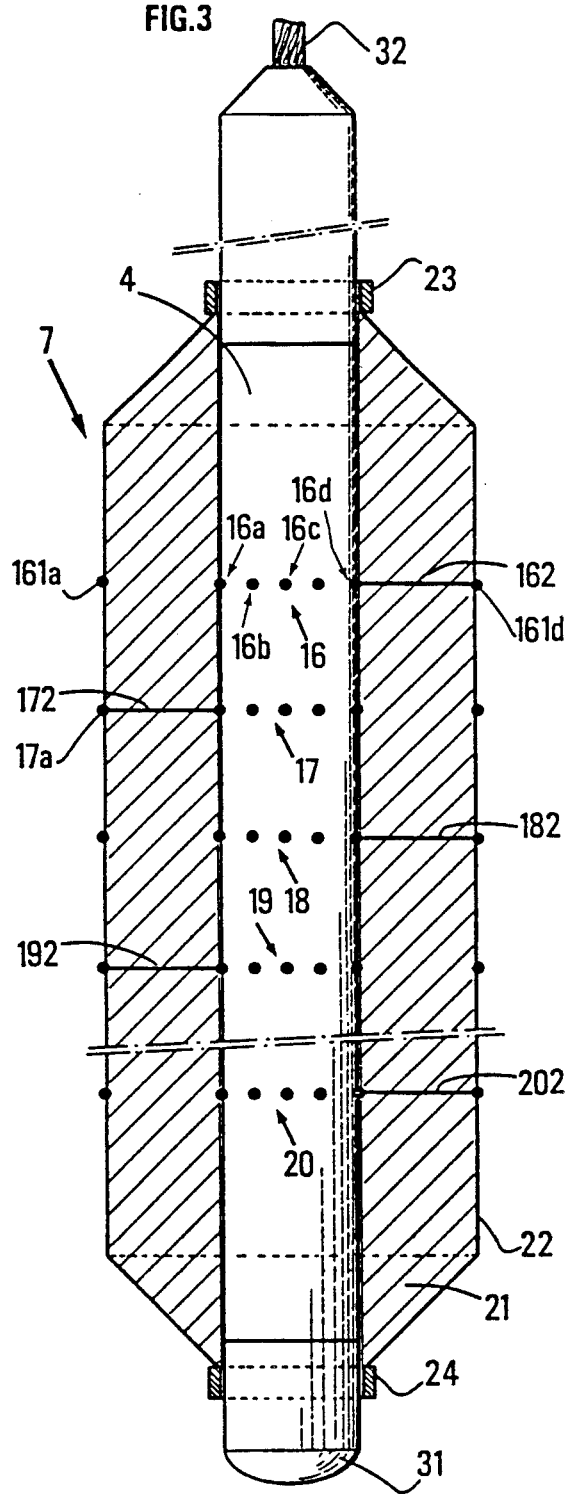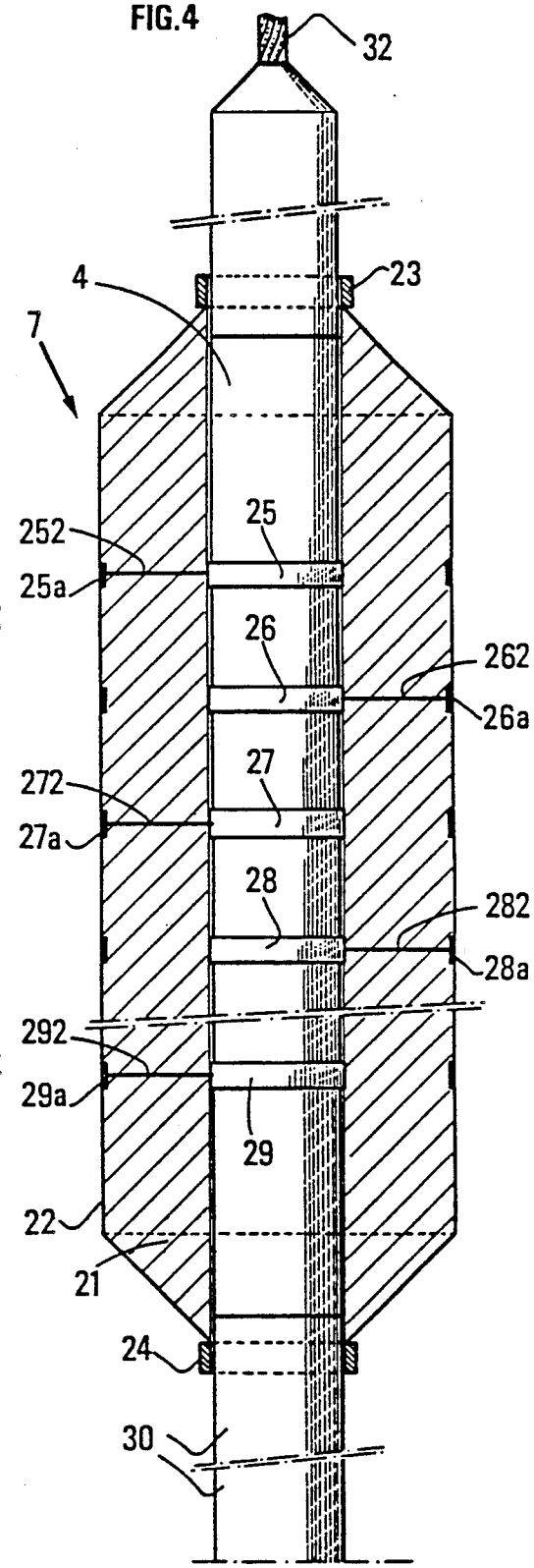

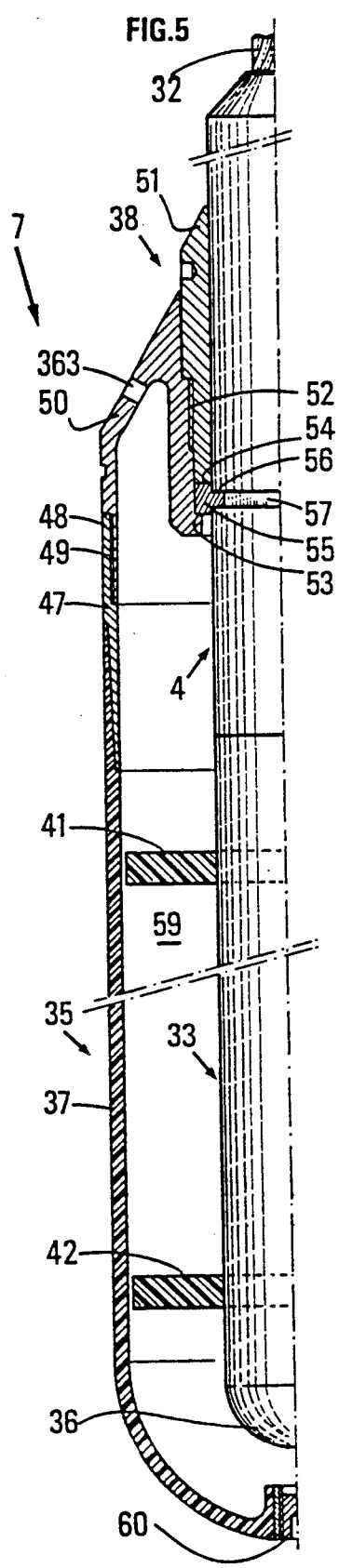
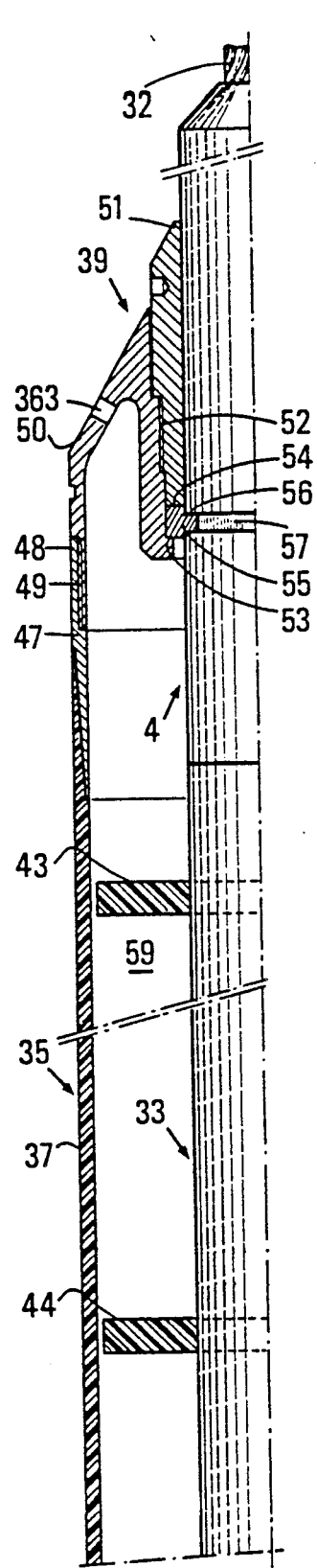
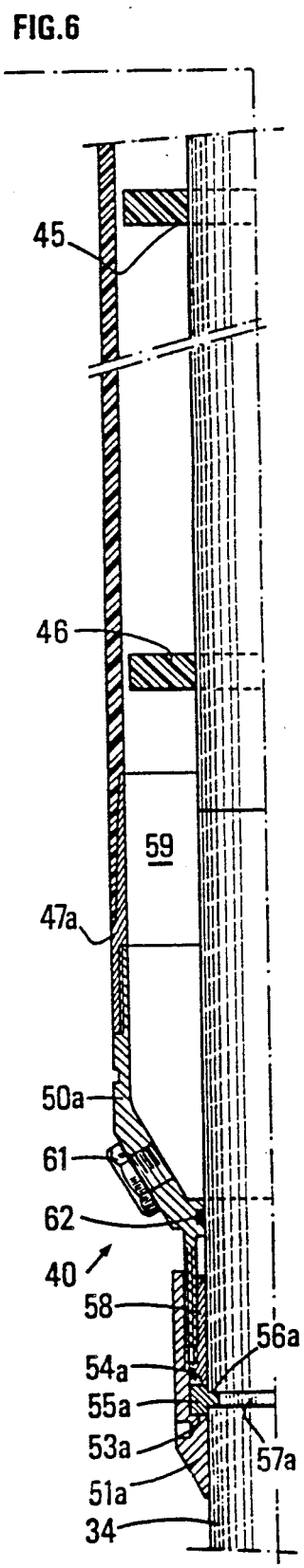

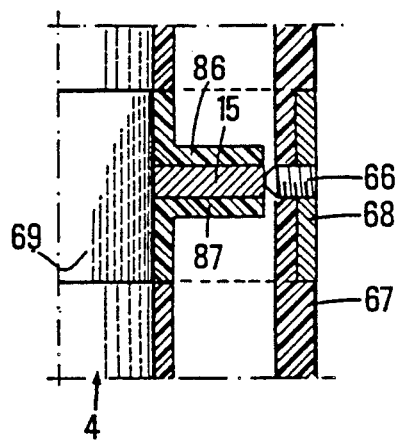
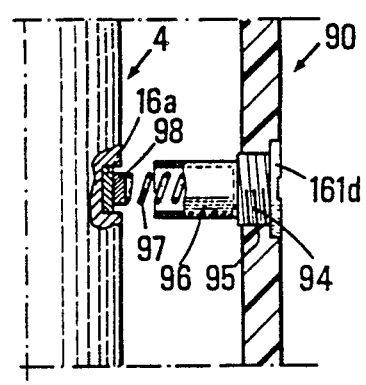
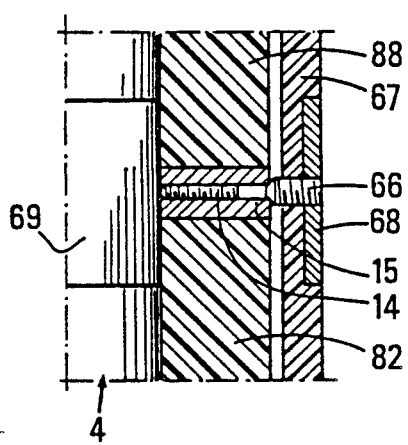
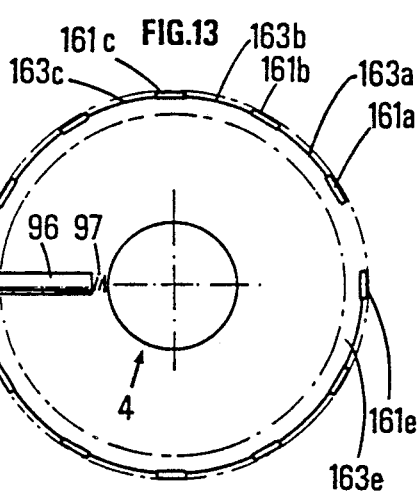

PROTECTIVE DEVICE PERMITTING MORE SPECIALLY THE USE OF PROBE IN LARGE DIAMETER WELLS

This is a continuation of application Ser. No. 069,174, filed July 2, 1987, now U.S. Pat. No. 4,929,915.

BACKGROUND OF THE INVENTION

The present invention relates to a protective device for widening and enlarging the effective active surface for probes or instruments used in logging measurements and methods using this device.

The present invention allows logging measurements to be made in a large diameter well using a logging probe adapted for operation in small diameter holes.

Of course, the notion of large diameter of the hole is to be considered relatively to the dimensions of the probe.

Furthermore, the present invention protects the probes or instruments or the sensitive parts thereof against the lateral and/or longitudinal mechanical actions.

When measurements are made, because of jamming, cave-ins in the well or high thrust forces (several tens of tons even hundreds of tons) or torsional stresses communicated to the drill pipe string, the probes and/or the tools are subjected to actions likely to destroy them irremediably particularly some of these instruments which are generally very expensive.

The probes generally used in well logging have standard diameters (for example 85 mm or 92.5 mm).

These probes allow measurements of good quality to be made in holes having diameters not exceeding a maximum value. Thus, for probes measuring the resistivity of the geological formation, the ratio between the diameter of the hole and the diameter of the probe should not exceed substantially 3.5. This is due to the phenomenon called "hole effect" by a man skilled in the art and will be explained hereinafter.

By applying a device of this invention to the probe, the present invention allows good quality measurements to be made with a small diameter probe. It becomes then possible, in accordance with the present invention, to increase the range of well dimensions in which a given probe may be used.

SUMMARY OF THE INVENTION

Thus, the present invention provides a protective device which allows the use of a logging probe of small diameter with respect to the well in which the probe is to operate. This device includes means for widening the effective diameter of said probe i.e. the active surface generating an electric or electromagnetic field.

This device may include a casing surrounding at least a sensitive part of said probe.

This casing may define a substantially sealed space about the sensitive part of said probe.

This sealed space may be filled with an electrically non conducting material such as distilled water or oil.

The protective device may include corresponding electrodes and means for electric connection between the electrodes of said probe and those of the protective.

The electric connection means may include an electric ring.

The protective has means for centering the casing, which may essentially include rings.

The centering means may include fixing means.

The device of the invention may include spacers for positioning at least some of said rings and it may include electrically non conducting walls inserted between at least two electrodes of the probe.

The device of the invention may be a solid assembly.

The device of the invention may be adapted to an induction or particularly a focused resistivity measuring probe or to a probe combining resistivity and induction measurements.

The device of the invention may very advantageously further provide protection for said probe and more precisely of those fragile parts which generally correspond to the active or sensitive zones of the probe.

Furthermore, the present invention provides a means for fixing a probe or instrument cover.

By probe or instrument cover it is meant any element capable of isolating the probe or instrument over at least a part thereof. This cover may for example be a local screen or a complete casing.

This cover may serve for example either for protection from outside influences, such as foreign bodies, physical (mechanical, thermal . . . ) or chemical stresses, or for selecting influences coming from or going towards the probe, such as those of gamma rays focused through a window and detected through another.

This fixing means is characterized in that it includes at least one housing cooperating with at least one arresting element and further including an assembly of securing pieces retained by the arresting element and having at least two stops cooperating with the arresting element for securing the casing of the probe.

The housing may be a groove formed in the probe and the arresting element, such as a system of two half moons, which form a collar for the probe.

One at least of the arresting elements may cooperate with two stops of the securing piece assembly.

The securing piece assembly may include an additional adjusting piece for moving the cover relatively to the probe.

The cover may be a cover protecting at least a sensitive part of the probe.

The cover may be a device for widening at least the sensitive part of the probe.

The securing means may include at least two grooves each cooperating with an arresting element and each forming a collar for the probe and the securing piece assembly may cooperate with at least these collars.

The cover may include at least one window adapted for letting through active measurement and/or intervention members of the probe or instrument.

The present invention also provides a method for using a probe of small diameter relatively to a well for carrying out measurements therein. In this method, said probe is equipped with a protective device, said device being adapted for transmitting the signals emitted by the probe without too much damping.

The present invention also provides a method for protecting at least a sensitive part of a probe or instrument from mechanical traction and/or compression an/or twisting actions. In this method, said probe is equipped with a cover, said cover being adapted for transmitting the mechanical forces outwardly of the sensitive part without transmitting too much stress to said sensitive part. The cover is adapted to transmit the signals emitted and/or received by said probe without too much damping.

The device, the securing member and the methods of the present invention may be applied to a well formed in a geological formation particularly for carrying out oil prospection.

BRIEF DESCRIPTION OF THE DRAWINGS

The present invention will be better understood and its advantages will be clear from the following description of different embodiments, which are in no wise limitative and which are illustrated by the accompanying Figures in which:

FIG. 1 illustrates a bare probe, placed in a large diameter hole,

FIG. 2 shows a probe equipped with a probe protective device,

FIGS. 3 and 4 show a particular embodiment of the protective devices,

FIGS. 5 and 6 show two particular embodiments of the protective devices adapted for example to induction probes, FIGS. 7 and 8 concern two particular embodiments of protective devices adapted to probes having electrodes, for example for measuring the resistivity of a geological formation, FIGS. 10 to 13 illustrate different embodiments of the electrical extension between the electrodes of the probe and the electrodes of the protective device.

DESCRIPTION OF THE PREFERRED EMBODIMENTS

Figure 7:
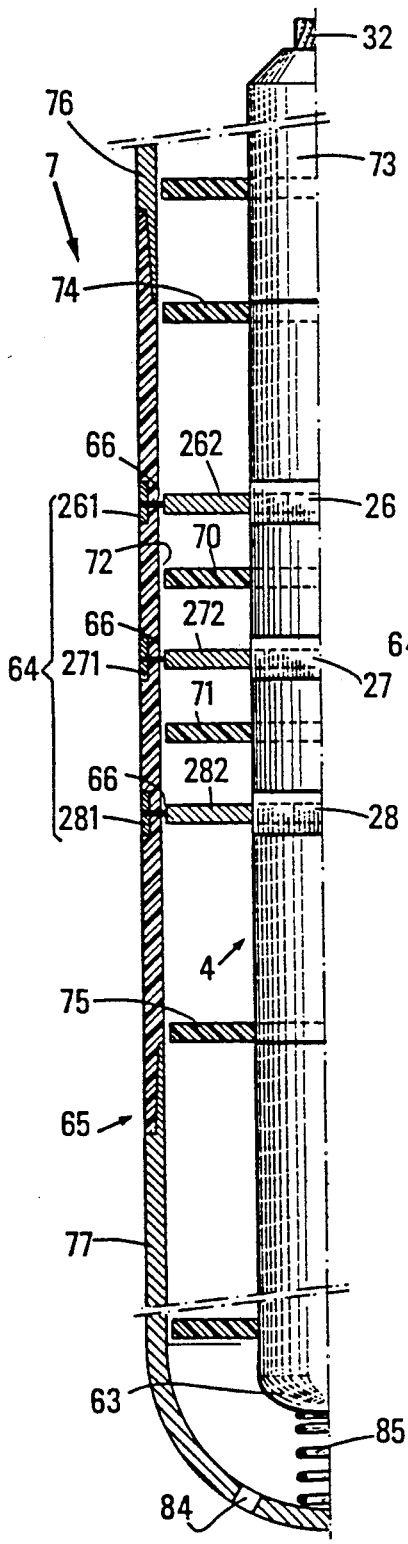

FIG. 1 shows a sectional view of a well 1 bored in geological formation 2.

Reference 5 designates the walls of the well and reference 4 the measuring probe.

The diameter d of the measuring probe 4 is much less than the diameter D of the well. Thus, a large number of the electric or electromagnetic field lines do not pass into the geological formation and are short circuited through the mud which fills the free space 3 between probe 4 and the walls of well 5. Reference 6 designates the outer wall of probe 4.

The present invention proposes fitting a probe protective device 7 (FIG. 2) to the probe 4.

In FIG. 2, the protective device includes a casing 8 of cylindrical shape whose diameter T is greater than that of the probe (d) and less than that of the well (D).

In FIG. 2, the cylindrical casing 8 is held in position coaxially with respect to the probe by a dividing wall in the form of a ring having two half shells 9 and 10 joined together by screws 11 and 12 which, when tightened, hold it on the probe. Other systems for fixing the dividing walls on the probe may be envisaged without departing from the scope of the present invention. For example, the dividing wall may have the shape of a ring formed of a single piece whose inner diameter is slightly greater than that of the probe. This ring 15 (FIG. 11) may have a radial thread 13 (FIG. 11) with which a screw 14 may cooperate which, when tightened, holds the ring on the body of probe 4.

FIGS. 3 and 4 show the case where the protective device is a solid assembly. This assembly may include a casing containing a filling material, or be simply in one piece, or a stack of rings.

In FIG. 3, the probe 4 is a probe for carrying out resistivity and induction measurements. This probe has five rows 16, 17, 18, 19 and 20 of active elements. Each of these rows includes several electrodes 16a, 16b, 16c . . . in the form of inserts disposed about a circle inscribed on the body of probe 4.

The device 7 includes a solid material 21 such as an electrically insulating epoxy resin.

Device 7 has on its outer wall 22 electrodes 161a to 161d also in the form of inserts.

When electrodes 16a, 16b, 16c, 16d . . . are connected together electrically, the electrodes 161a, 161b . . . of the same row will also be connected electrically together and it will be sufficient for only one of the electrodes of the protective device to be connected electrically to an electrode of the homologous row 16 of the probe. This is shown by the electric connections 162, 172, 182, 192 and 202 respectively for rows 16, 17 18, 19 and 20 in FIGS. 3 and 4.

The inserts in the same row of the device are then connected together, however at least two inserts of the same row are not connected together, so as not to form closed circuits and cause the creation of current loops. This is illustrated in FIG. 13 which clearly shows that there is no electric connection between inserts 161e and 161a, whereas electrical connections 163a, 163b, 163c, 163d, 163e do exist.

Such a configuration allows the induction field to pass through the protective device 7 of probe 4 without too much attenuation i.e. the active surface of the probe is enlarged to reduce attenuation of electric and electromagnetic fields caused by the presence of conductive material between the probe and the inner wall of the well casing.

The protective device is held in position on the probe by positioning and holding rings 23 and 24 (FIGS. 3 and 4).

FIG. 4 shows the case of a device 7 for a probe 4 forming a solid assembly fitted to a probe for measuring the resistivity of the formation which does not make induction measurements. Generally, this type of probe has two electrodes in the form of continuous rings, placed at different heights in the probe.

The probe of FIG. 4 has five annular electrodes identified by the reference numerals 25, 26, 27, 28 and 29.

The protective device has five annular electrodes analogous to the preceding ones and respectively, identified by the reference numerals 25a, 26a, 27a, 28a and 29a.

Each of these electrodes is connected to the corresponding electrode of a probe by electric connections 252, 262, 272, 282 and 292.

These the connections may include metal rods possibly threaded and/or have pushers, such as those illustrated in FIGS. 12 and 13.

The protective device is fixed to the probe by rings 23 and 24.

In the case of FIG. 4, the probe is extended by the lower tubular element 30 and it is therefore necessary for the protective device to be pierced with a through bore.

In the case of FIG. 3, the protective device 7 could be closed at its lower part and include the lower end 31 of probe 4.

The probes of the different FIGS. 3 to 9 are shown suspended from a cable 32, but it is obvious that without departing from the scope of the present invention, the probes may be fixed to the end of a tube such as a drill pipe string, or in the case where they themselves correspond to a portion of a tube. The following patents:

FR-A-2 544 013; FR-A-2 547 861; FR-A-2 564 894; U.S. Pat. No. 4 457 370 and U.S. Pat. No. 4 570 709 illustrate examples of use in which the present invention applies.

In the case where probe 7 of FIG. 3 is not a probe ensuring both resistivity and induction, but simply an induction measurement probe, it would not include the rows of electrodes 16, 17, 18, 19 and 20 and the widener would have neither electrodes 161a . . . 161d nor conductors 162, 172, 182, 192 and 202. Thus, the widener could be formed of a filled assembly, possibly solid, made from an electrically non conducting material such as an epoxy resin.

FIGS. 5 and 6 show two other embodiments of the protective device fitted to induction probes.

In the case of FIG. 5, reference numeral 33 designates the sensitive part or active zone of the induction probe which is placed at the end of a cable 32 and is not extended by a tubular element 34, as is the case for the probe of FIG. 6, this tubular element being possibly another probe or another member.

In the case of FIG. 5, the protective device has a casing 35 surrounding the lower end 36 of the probe. This casing is made from an electrically non conducting material and may be made from a non conducting epoxy material.

Of course, it is sufficient simply for part 37 of casing 35 adjacent the active zone 33 of probe 4 to be made from an electrically non conducting material.

Thus, in the case of FIGS. 5 and 6, the endmost parts 38, 39 and 40 of device 7 may include metal.

The casing of device 7 is centered by dividing walls 41 and 42, in so far as the embodiment of FIG. 5 is concerned, end walls 43, 44, 45 and 46 in so far as the embodiment of FIG. 6 is concerned. Of course, at least the dividing walls adjacent the active zones 33 of the probe are made from an electrically non conducting material. These dividing walls may be secured to the probe in different ways, as shown particularly in FIG. 2.

Furthermore, without departing from the scope of the present invention, the dividing walls may be secured to the protective device instead of being secured to the probe itself.

The following description gives one non-limitative embodiment of the endmost parts 38 and 39 of the protective devices, these endmost parts being adapted for fixing the devices to the probe.

In the particular example shown in FIGS. 5 and 6, the casing 35 of the device ends at its upper part (relatively to the Figures) in a metal piece 47 on which the electrically non conducting part of the casing is fixed during molding, for example by bonding.

This metal piece 47 ends in a tapped portion 48 which cooperates with a threaded portion 49 of an intermediate piece 50. This intermediate piece cooperates with a securing piece 51 by means of a screw thread system 52.

The intermediate and securing pieces include respectively stops 53 and 54 which encase an arresting element, such as a system of two half moons 55, having a collar 56 which cooperates with a groove 57.

Thus, clamping of the intermediate piece 50 and the securing piece 51 hold and position the protective device.

The lower end 40 of the embodiment shown in FIG. 6 is secured substantially in the same way and has a metal part 47a which is secured to the non metal part of the casing. This part cooperates with an intermediate piece 50a which itself cooperates with the securing piece 51a.

The intermediate piece 50a cooperates with an additional adjusting element 58. This adjusting element extends the intermediate piece so as to form a stop 54a which will cooperate with the half moons 55a and stop 53a for holding the end 40 in position. The half moons 55a include collars 56a which cooperate with a groove 57a.

The space 59 between the casing 35 of the protective device 7 and the measuring probe 4 must include an electrically non conducting element, whereas the mud present in the environment in which the probe is to be used is generally conducting. It is then advisable to provide a system preventing the introduction of mud into space 59.

Thus, for example, this free space 59 may be filled with an electrically non-conducting liquid, such as distilled water or oil. In this case, no opening should be provided at the lower part of the probe, more especially so as to prevent the isolating liquid from escaping. However, in order to allow filling and emptying of this liquid, plugs 60 and 61 are provided respectively in the embodiment shown in FIGS. 5 and 6.

In addition, in FIG. 6, a seal 62 is provided.

At the upper part of the protective device is provided an opening 363 (FIGS. 5 and 6) so as to maintain the spacers situated on each side of casing 35 at the same pressure.

Such an orifice may serve for filling the free space 59.

Moreover, this orifice may be replaced by a flexible membrane, so as to maintain the pressure balance on each side of the casing, while avoiding any exchange between the fluid occupying the free space 59 and the outside environment.

Figure 8:
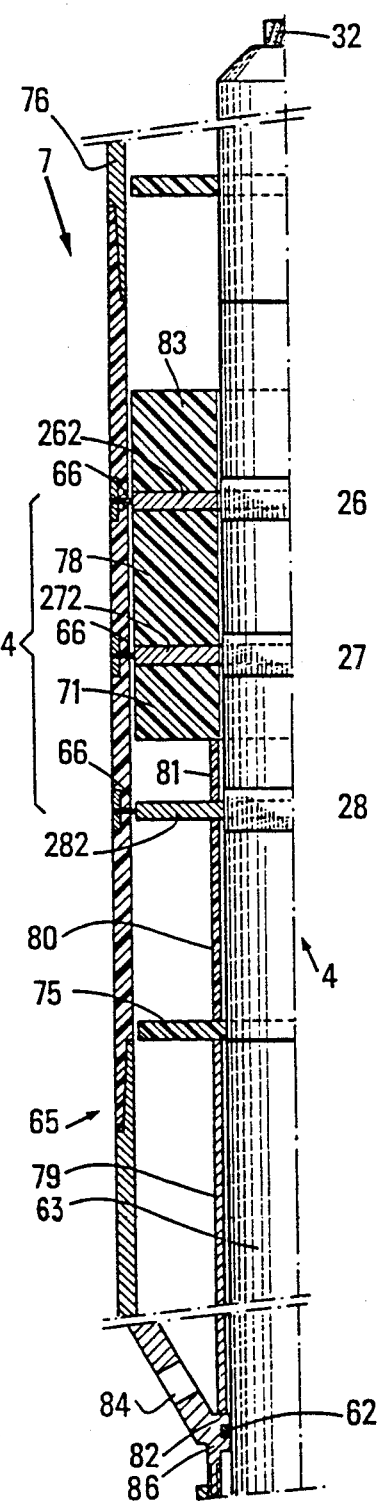

FIGS. 7 and 8 illustrate two other embodiments relating to probes for measuring the focused resistivity of geological formations. Some of the focused resistance measurements are grouped under the name of "Laterolog".

In the case of FIGS. 7 and 8, probe 4 has in a way which is in no wise limiting, three annular electrodes 26, 27 and 28.

In the case of FIG. 7, the probe is not extended by a lower tubular element, as is the case for FIG. 8. Thus, in the case of FIG. 7, the casing of device 7 includes the whole of the lower end 63 of probe 4.

The portion 64 of casing 65 of device 7, which is situated in the vicinity of the active zone of probe 4, is made from an electrically non conducting material. This portion has annular electrodes 261, 271, and 281, respectively, analogous to electrodes 26, 27 and 28.

The electric connection between the electrodes of probe 4 and the electrodes of the protective device may be provided by means of conducting rings 262, 272 and 282 and conducting studs 66.

Rings 262, 272 and 282 may be secured to the electrodes of the probe as shown above in connection with FIG. 2 or 11.

FIGS. 10 and 11 show one embodiment of conducting studs 66 which are screwed into the electrodes 68 of the protective device and/or of the casing 67 of this device. Studs 66 thus screwed in come to bear against the conducting rings 15 and provide the electric continuity between electrodes 69 of the probe and 68 of the protective device.

When the free space between casing 65 and probe 4 is not filled with a non-conducting material, as is the case for FIGS. 5 and 6, it is then advisable to insert non-conducting rings 70 and 71 between the electrodes so that there are only small amounts of current passing from one electrode of the probe 4 to the other.

In the case of FIG. 7, the amount of current passing directly from electrode 26 to electrode 27 is due solely to the clearance 72 existing between the non conducting rings 70 and the portions 64 of casing 65.

This amount of current is small, since clearance 72 in FIG. 7 is small.

When the ends 63 and 73 of the probe are conducting and serve for collecting the return current, non-conducting rings 74 and 75 should be inserted between the endmost electrodes 26 and 28 and the conducting ends 73 and 63 of the probe.

In the case of FIGS. 7 and 8, the parts of the casing 65 opposite the conducting ends 73 and 63 of the probe are made from an electrically conducting material.

Of course, these parts, which may be made from metal, only begin beyond the non-conducting rings 74 and 75.

The embodiments illustrated in FIGS. 7 and 8 have an orifice 84, at the low part, which allows the mud in the well to pass upwardly within the casing 65 and may also include an orifice (not shown) in the upper part. This orifice may be identical to that 363 of FIGS. 5 and 6.

Reference numeral 85 designates a spring providing a direct connection between the conducting part 77 of the casing and the conducting end 63 of the probe.

With such an assembly, the space between the non conducting rings 75, the conducting parts 77 and the end 63 of the probe may be filled with a non-conducting material.

The ends of the protective devices shown in FIGS. 7 and 8 may be fixed to probe 4 in the same way as in FIGS. 5 and 6.

Nevertheless, in the case of FIG. 8, the seal 62 may be omitted;

In fact, in the embodiment shown in FIG. 8, it is not necessary to isolate the filling fluid from the surrounding environment in which the device of the operation is to operate.

FIG. 8 includes several variants of construction of the protective device. In a first variant, the non-conducting rings are of great thickness and may even have a thickness equal to the distance separating two successive conducting rings 262 and 272, as is the case for ring 78.

Furthermore, it is possible to position and hold the different rings, conducting or not, in position by means of a stack of spacers and rings as is shown in FIG. 8. The spacers 79, 80 and 81 shown in this Figure serve for holding rings 75, 282 and 71 in position.

It is obvious that in this case it is advisable to dispose means for holding and/or positioning the spacers, either on the probe 4, or on the casing 65 of the widener. It is this latter case which is shown in FIG. 8 where the forces exerted on spacer 79 are transferred to casing 65 through the stop 82.

The forces exerted on the isolating ring 83 of FIG. 8 may be transferred to the probe by the ring 83 itself.

Spacer 79 of FIG. 8 at the conducting end 63 is also conducting, so as to allow the return of the electric currents.

Of course, if this spacer had been electrically non conducting, the conducting part 77 should have been in direct contact with the conducting end 63 of probe 4, for example, through the bearing surface 86.

FIG. 10 shows a particular embodiment of the conducting rings 15. In fact, they are enchased between two layers of isolating material 86 and 87. The assembly thus obtained completely isolates electrode 69.

In such an embodiment, the non conducting rings situated on each side of the conducting ring 15 are therefore formed by non conducting material layers 86 and 87.

In the case of FIG. 11, the conducting ring 15 is enchased by thick spacers 88 and 82 which also provide the non conducting ring function.

In FIGS. 10 and 11, the height of the electrodes 68 of the protective device is substantially the same height as the electrode 69 of the probe.

Figure 9:
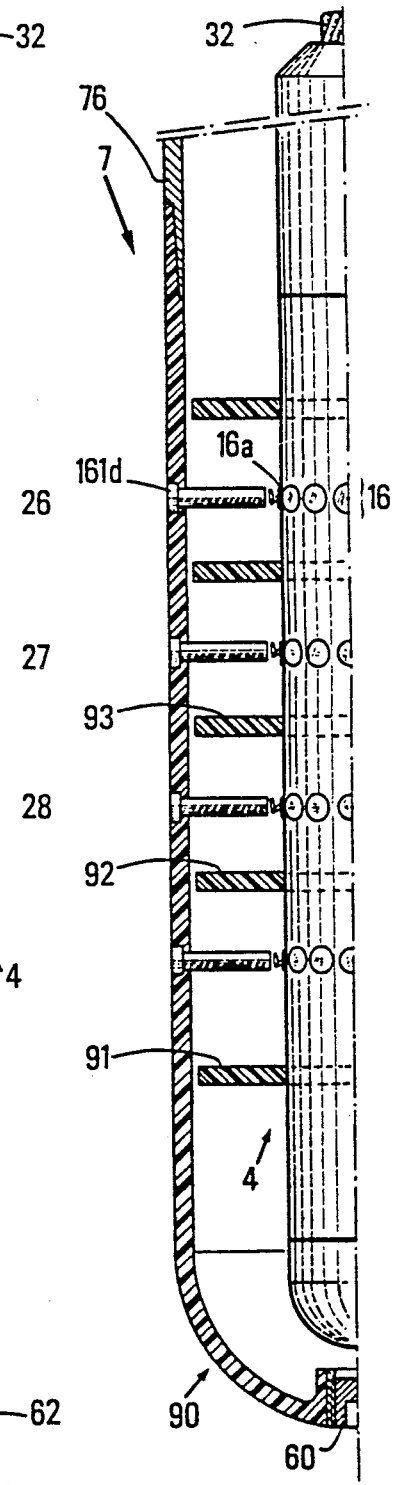
FIG. 9 shows a probe widener adapted to a probe having electrodes and able to carry out induction measurements.

FIG. 9 illustrates the case of a probe making focused resistivity measurements and induction measurements.

In this case, the probe should be placed in an environment which conducts electricity as little as possible. This is why casing 90 is sealed in the same way as casing 35 of FIG. 5. Thus, this protective device is made from a non conducting material and includes a plug 60, as distinct from the embodiment of the device shown in FIG. 5.

Casing 90 includes electrodes having the form of inserts 161a, 161b, 161c, 161d . . . , as shown in FIG. 13. It should be noted that the arrangement shown in FIG. 13 applies not only to the case of FIG. 3 but also to that of FIG. 9, since the probe illustrated in FIG. 3 is of the same type as that illustrated in FIG. 9.

The difference between these two embodiments resides in the fact that, in the case of FIG. 3 the device is formed of a solid assembly, whereas in the case of FIG. 9 the device includes a casing 90 and centering rings 91, 92, 93 when moreover the space between casing 90 and probe 9 may be filled with an insulating liquid such as distilled water or oil.

The insert electrodes 161d are disposed and connected together in the same way as shown in connection with FIGS. 3 and 13.

Preferably, a single electrode 16a from each row 16 is connected to an insert electrode 161d of the row of analogous electrodes situated on the outer wall of the device.

This connection is shown in detail in FIG. 12, reference 16a designating the inset electrode integral with probe 4. Reference 161d designates the insert electrode situated on the outer wall of the device.

This insert has a screw thread 94 which cooperates with a tapping 95 formed in the casing 90 of the device. Moreover, this insert includes a housing 96 in which is placed a spring 97 at the end of which is placed a contact 98.

Spring 97 has a length such that when the insert 161d is screwed onto casing 90, it maintains the electric connection between inserts 16a and contact 98, thus forming a pusher.

Of course, the embodiment illustrated in FIG. 9 requires angular positioning of device 7 relatively to probe 4, which positioning may be provided by any known means.

Furthermore, the widener shown in FIG. 9 may be adapted at its lower part in the same way as illustrated in the lower part of FIG. 6 so that the probe 4 of FIG. 9 may be extended by an additional element, more especially a tubular element.

Figure 14:
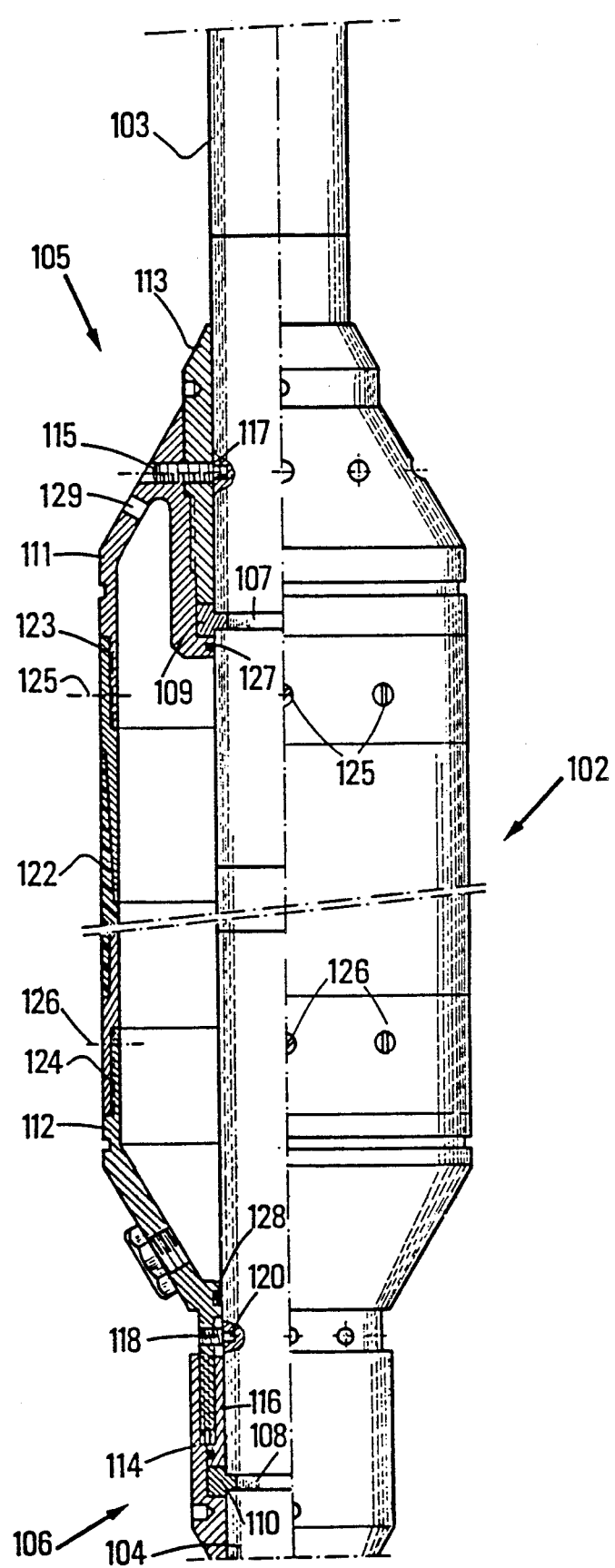
FIG. 14 shows a probe equipped with a cover for protection against twisting forces.

FIG. 14 illustrates a probe 101 or a sensitive part of a probe having a cover 102 protecting this probe more particularly from longitudinal (traction or compression)

and transverse and twisting actions existing between an upper element 103 and a lower element 104 connected respectively to the upper and lower parts of probe 101.

These lower and upper elements may be those of a drill pipe string or other parts of the probe little or not at all sensitive to twisting or else other probes included in a probe string.

Mechanical stresses such as those caused by traction or compression forces may for example occur in the use of the devices and methods described in the patents: U.S. Pat. Nos. 4 457 370; 4 570 709; FR-A-Nos. 2 547 861; 2 544 013 or FR-A-No. 2 564 894.

The cover is fixed to the ends of the probe by two fixing members 105 and 106 which cooperate respectively with two grooves 107 and 108 placed at the ends of the probe.

The first 105 and the second 106 of these two fixing members each include an arresting element, such as a system of two half moons respectively 109, 110 cooperating with the first 107 and the second 108 groove and forming a first and a second collar relatively to the outer surface of probe 101.

A first assembly of fixing pieces which enchases the first collar by locking it includes an intermediate piece 111 and an end part 113 and forms two stops adapted for cooperating with this first collar. By encasing the arresting member is meant the fact that the securing pieces surround the arresting member while preventing its escape.

A second assembly of securing pieces which is adjustable and which encases the second collar by locking it includes an intermediate piece 112, an end part 114 and an adjustment piece 116 and forms two stops adapted for cooperating with this second collar.

The first and second fixing members 105, 106 are held against rotation with respect to the probe by means of screws 115 and 118 fastening the fixing pieces together and whose ends (of these screws) each cooperate with studs 117 and 120 placed at the upper and lower ends of the probe.

Between each of these two existing members 105 and 106 is screwed, by means of two threaded portions 123 and 124, a protective casing 122 which is immobilized on these members by a series of screws 125 and 126, adapted for preventing twisting between the lower 104 and upper 103 elements and adapted to transmit the twisting forces between them.

If it is desired to seal the cover 102, seals 127 and 128 may be placed in the intermediate pieces 111 and 112 to balance the pressures between the inside and the outside of the cover through an orifice 129. The cover may include windows adapted for the operation of members such as anchorage arms, probe detector.

Of course, the cover will be adapted for transmitting the signals emitted or received by the probe without too much damping and the influence of this cover on the measurements made by a probe will be known so as to allow correct calibration of the probe.

The cover may be adapted so as to protect the probe or the instrument from certain mechanical actions only. Thus, for example, the cover may be adapted for protecting the probe solely against traction and compression forces.

What is claimed is:

1. A protective device for a logging probe having a longitudinal axis and having an exterior surface with a small diameter relative to a well in which the probe is to operate, said device comprising a rigid tubular-like casing adapted to be connected to the exterior surface of the probe and acting to enlarge the effective diameter of the exterior surface of the probe in comparison with the well diameter, fastening means for locating said rigid casing coaxially on the probe and for fastening the casing circumferentially around the probe on at least one level of said exterior surface of the probe, said rigid casing having an exterior surface longitudinally surrounding at least the exterior surface of the probe arranged around an active part of said probe for carrying out the logging measurement, said casing being capable of transmitting a signal emitted and/or received by said probe without substantial attenuation on the signal, wherein the exterior surface of the casing is spaced from the exterior surface of the probe and from the active part of the probe thereby enlarging the effective diameter of the probe and the fastening means for the casing are located on the probe so that mechanical stresses occurring in the well are applied and transmitted along the exterior surface of said casing without adversely acting on the exterior surface of the probe arranged around the active part of said probe.

2. A protective device for a logging probe according to claim 1, wherein said casing has an exterior wall which defines said exterior surface and which is spaced from the exterior surface of the probe, said exterior wall and said probe defining a sealed space around the active part of said probe.

3. A protective device for a logging probe according to claim 2, wherein said sealed space is filled with an electrically non-conducting material including distilled water or oil.

4. A protective device for a logging probe according to claim 1, wherein the rigid casing comprises a centering means for positioning the casing coaxially with the probe.

5. A protective device for a logging probe according to claim 4, wherein said centering means comprise rings.

6. A protective device for a logging probe according to claim 5, wherein said centering means comprise means for fixing said rings around the probe.

7. A protective device for a logging probe according to claim 5, wherein spacers are located longitudinally against the exterior surface of the probe for maintaining the position of the electrical connections and centering the rings on the probe.

8. A protective device for a logging probe according to claim 1, connected to an induction logging probe, wherein the casing surrounds the active part of the probe so as to form a closed volume completely isolated of the well, without attenuation of a signal emitted and/or received by said probe.

9. A protective device for a logging probe according to claim 1, connected to a resistivity measurement logging probe.

10. A protective device for a logging probe according to claim 1, wherein said casing has an exterior wall that is adapted for withstanding lateral and axial stresses of compression and traction, and torsion mechanical actions, without transmitting said stresses to the active part of the probe.

11. A protective device for a logging probe according to claim 1, connected to a probe for combining resistivity and induction measurements wherein said probe includes electrodes in the form of inserts located around the circumference of the probe and around the casing, on different planes perpendicular of the probe, a single electrical connection being placed in a plane between an insert of the probe and an insert of the casing.

12. A protective device for a logging probe according to claim 1, wherein said casing comprises at least one electrically non-conducting dividing wall between an exterior surface of the casing and the exterior surface of the probe, said wall being inserted substantially perpendicular to the probe between two planes, said wall comprising electrodes of the probe, electrodes of the casing and electrical connection means.

* * * * *